US006370875B1

(12) United States Patent
Decker

(10) Patent No.: US 6,370,875 B1
(45) Date of Patent: Apr. 16, 2002

(54) AIR POWERED HYDRAULIC JACK WITH LOAD SENSING AUTO SHUT-OFF AIR CONTROL

(75) Inventor: Arnold F. Decker, Aurora, IL (US)

(73) Assignee: Templeton, Kenly & Co., Inc., Broadview, IL (US)

( * ) Notice: Subject to any disclaimer, the term of this patent is extended or adjusted under 35 U.S.C. 154(b) by 0 days.

(21) Appl. No.: 09/533,416

(22) Filed: Mar. 22, 2000

(51) Int. Cl.[7] .......................... F16D 31/02; F04B 49/00
(52) U.S. Cl. .............................. 60/419; 60/431; 417/47
(58) Field of Search .......................... 60/419, 409, 430, 60/431; 417/46, 47, 38, 39, 41, 43

(56) References Cited

U.S. PATENT DOCUMENTS 3,816,025 A * 6/1974 O'Neill .................... 417/38 X
4,251,055 A 2/1981 Leong et al.
4,889,472 A 12/1989 Decker et al.

FOREIGN PATENT DOCUMENTS

| | | | | |
|---|---|---|---|---|
| JP | 52-75896 | * | 6/1977 | .................. 417/46 |
| JP | 58-46256 A | * | 3/1983 | .................. 60/419 |
| RU | 756084 | * | 8/1980 | .................. 60/419 |
| RU | 1537901 | * | 1/1990 | .................. 60/419 |

* cited by examiner

*Primary Examiner*—John E. Ryznic
(74) *Attorney, Agent, or Firm*—Michael Best & Friedrich LLP

(57) ABSTRACT

The invention provides an improved fluid motor powered lift system having a valve arrangement for reducing or interrupting the fluid flow supplied to the motor when the pressure in the lift system exceeds a predetermined pressure. A valve arrangement is provided to shut-off or throttle back the fluid supplied to the fluid motor when the fluid pressure in the lift reaches a predetermined level. When the pressure in the lift system exceeds the predetermined level, pilot pressure is supplied to an automatic shut-off valve, and this in turn reduces fluid flow to fluid air motor thereby reducing or preventing pump pressure.

8 Claims, 4 Drawing Sheets

AIR POWERED HYDRAULIC JACK WITH LOAD SENSING AUTO SHUT-OFF AIR CONTROL

FIELD OF THE INVENTION

The invention relates to air powered hydraulic lifting systems and more particularly to controls for effecting actuation of such systems.

BACKGROUND PRIOR ART

In hydraulic lift systems it is advantageous in some applications to use an air pressure driven motor to drive a hydraulic fluid pump which selectively supplies hydraulic fluid pressure to the hydraulic cylinder of the hydraulic lift system. An example of a prior art arrangement is illustrated in U.S. Pat. No. 4,251,055. Attention is also directed to U.S. Pat. No. 4,889,472.

In prior art arrangements of such hydraulic lift systems a manually operated control valve is provided to control the flow of hydraulic fluid from the pump to the cylinder. A pressure relief valve is connected between the pump and the fluid cylinder to exhaust fluid to the tank when fluid pressure reaches a predetermined pressure. If the cylinder reaches the end of its stroke and the hydraulic pump continues to operate, hydraulic fluid is exhausted to the tank through the pressure relief valve to the tank. This can result in damaging heat generation in the hydraulic system and destruction or deterioration of components of the system such as seals and other non-metallic components.

SUMMARY OF THE INVENTION

The invention provides an improved fluid motor powered fluid lift system having a valve arrangement for reducing or interrupting the fluid supplied to the fluid motor when the pressure in the lift system exceeds a predetermined pressure.

One of the features of the construction of the invention is that a valve arrangement is provided to shut-off or throttle back the fluid supplied to the fluid motor when the fluid pressure reaches a predetermined level. When the pressure of the lift system exceeds the predetermined level, pilot pressure is supplied to an automatic shut-off valve, and this in turn shuts off fluid flow to the fluid motor thereby preventing the pump from continuing to supply pressure that would otherwise be bypassed by relief valves to exhaust back to the reservoir.

DESCRIPTION OF THE PREFERRED EMBODIMENT

Figure 1:
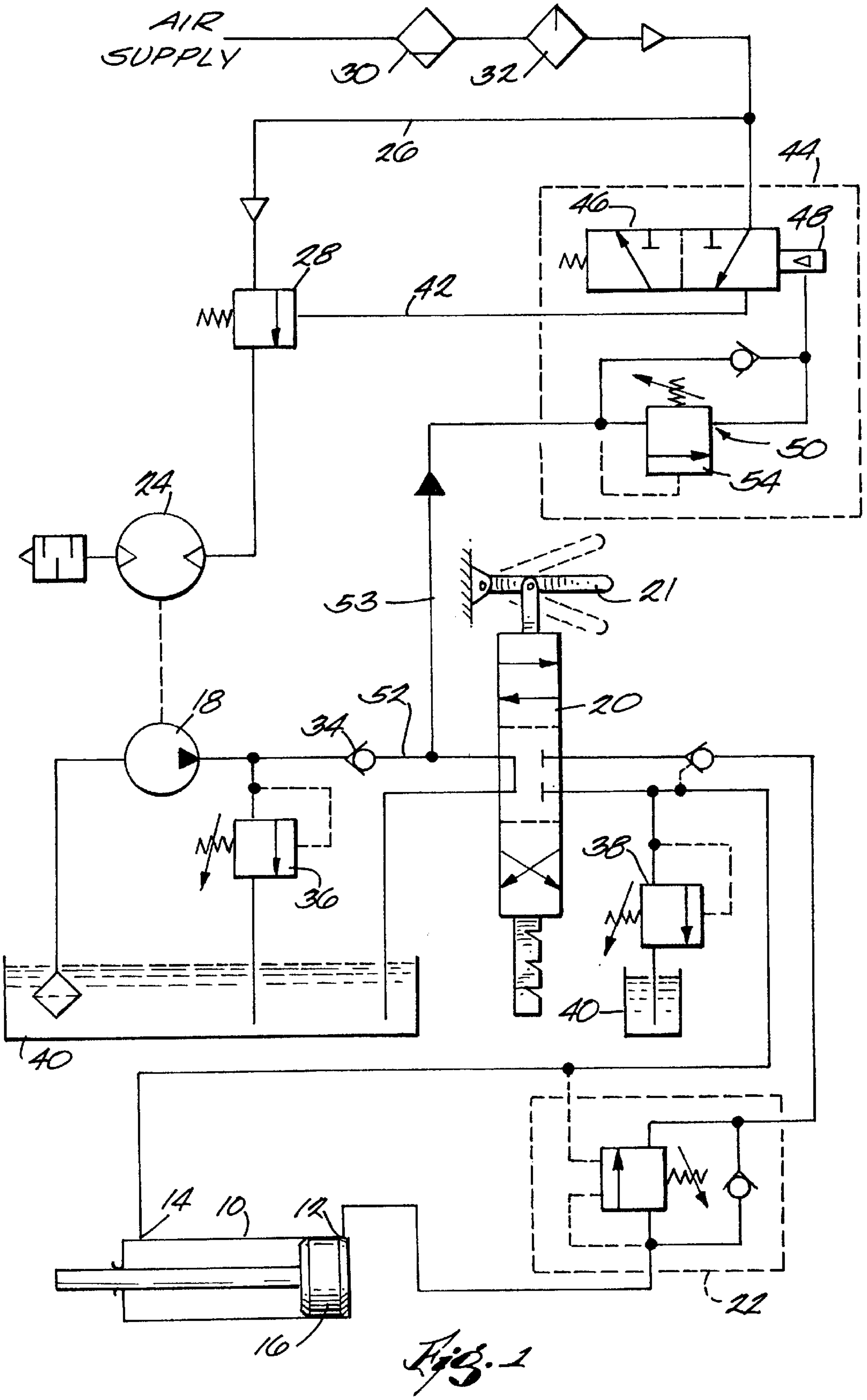
FIG. 1 is a schematic illustration of an air powered hydraulic lifting system embodying the invention.
Figure 3:
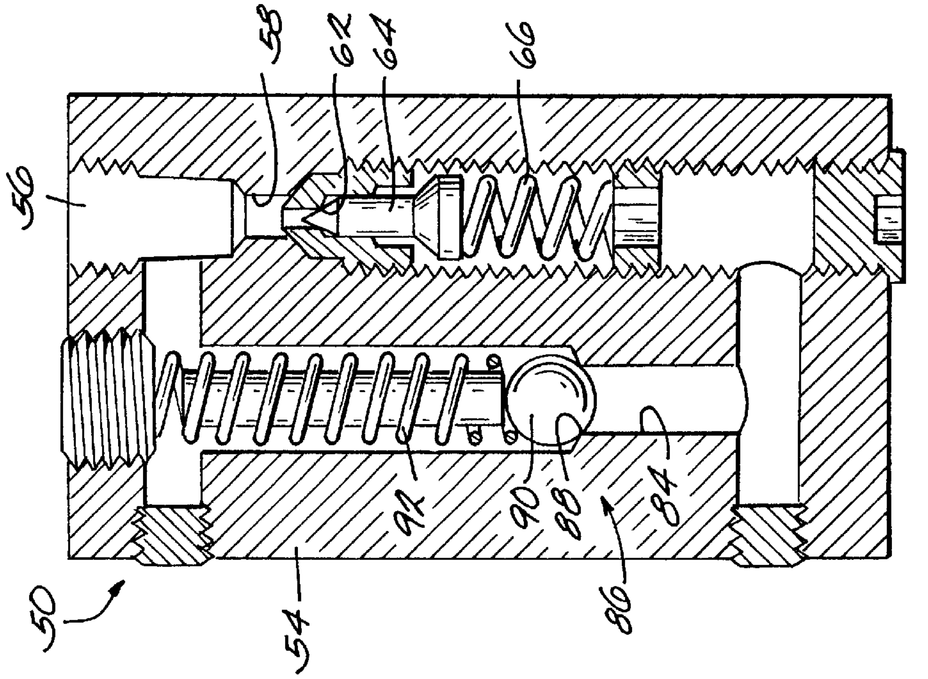
FIG. 3 is a cross section view taken along line 3—3 in FIG. 2.
Figure 2:
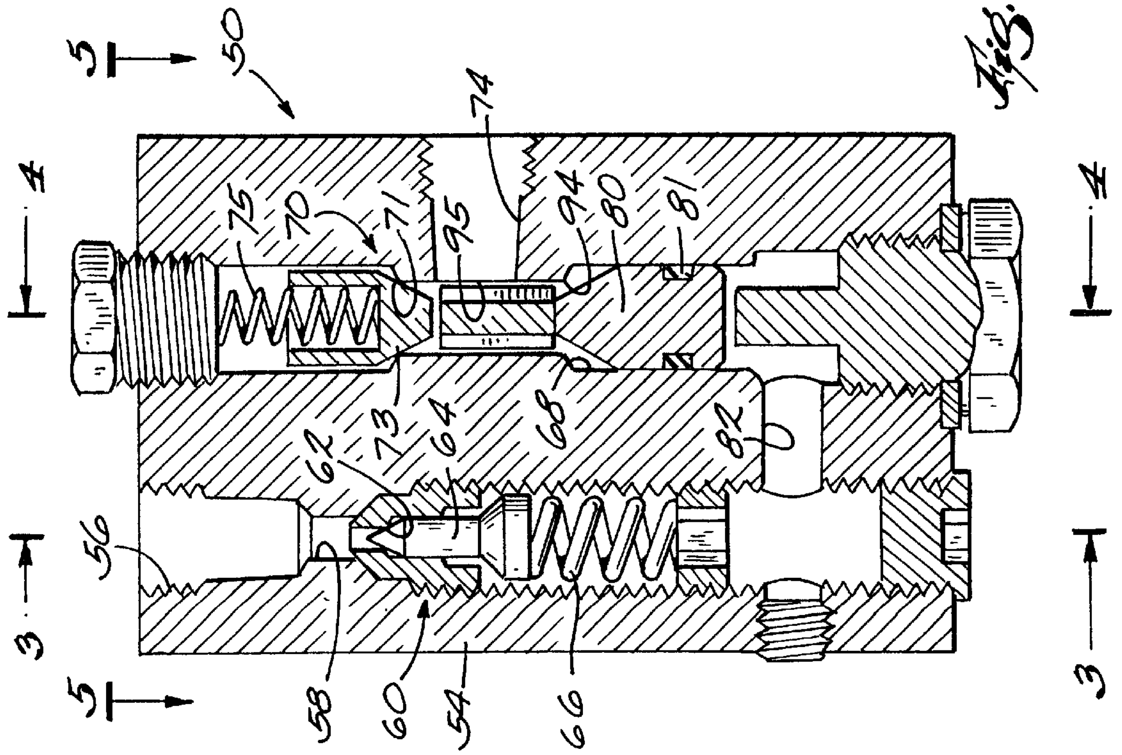
FIG. 2 is a cross section of an automatic shutoff control valve shown in FIG. 1.
Figure 5:
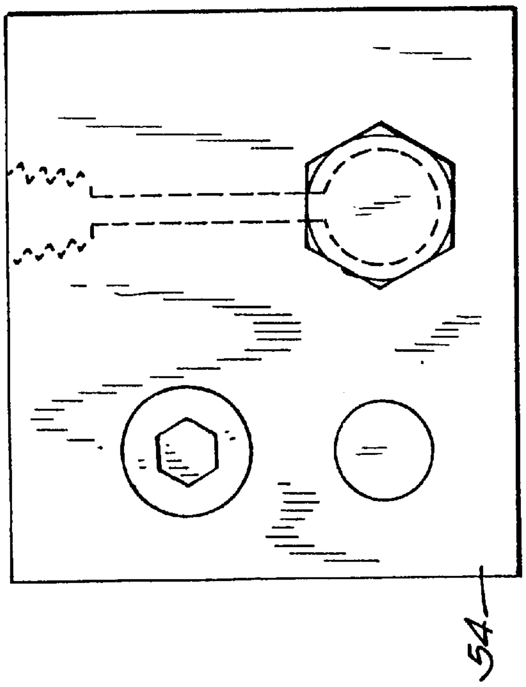
FIG. 5 is a view taken along line 5—5 in FIG. 2.
Figure 4:
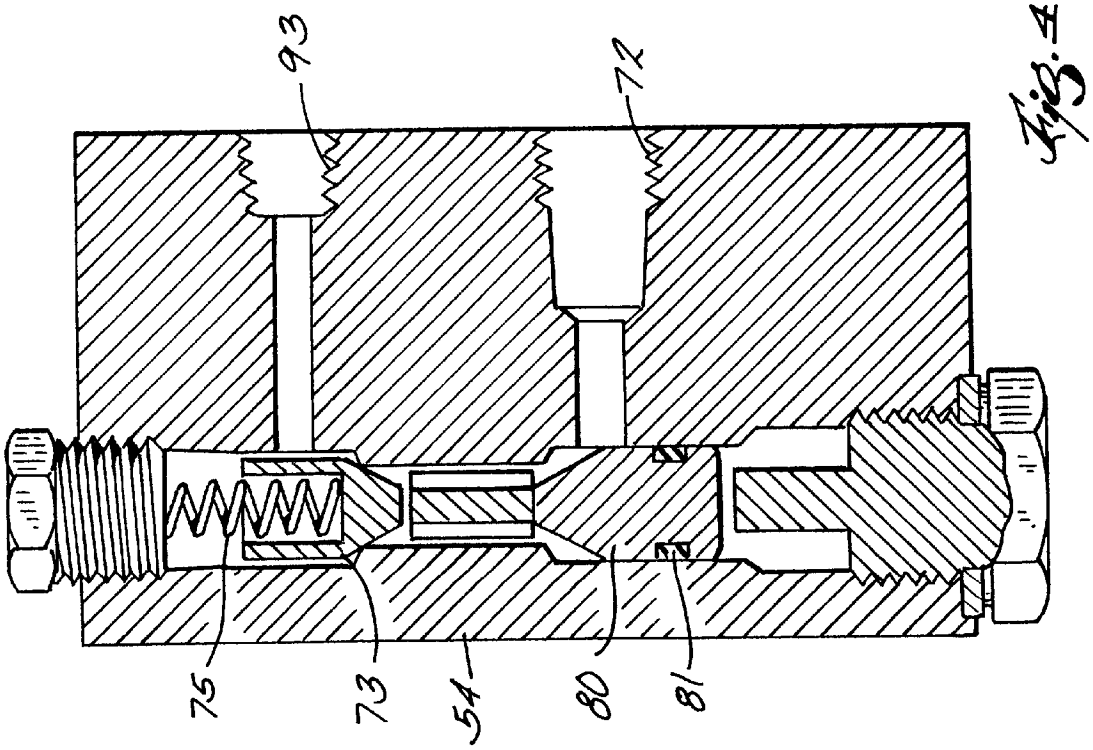
FIG. 4 is a cross section view taken along line 4—4 in FIG. 2.

Illustrated in FIG. 1 is a lift cylinder 10 which in one preferred form of the invention can be a hydraulic cylinder.

In the illustrated arrangement, the lift cylinder 10 has ports 12 and 14 and an extensible piston 16. A fluid pump 18 is connected to the ports 12 and 14 of the cylinder 10 through a control valve 20. The control valve 20 can be a three position, four-way valve operated by a manually operated control lever 21. In a preferred form of the invention a load holding valve 22 is provided in fluid connection between the ports 12 and 14 and the control valve 20. The load holding valve 22 provides controlled or balanced discharge of fluid from the cylinder 10 when the cylinder is loaded. The load holding valve 22 is conventional in its construction and the specific arrangement of components making up the load holding valve 22 is not part of the present invention.

An air motor 24 is operably connected to the hydraulic pump 18 to selectively drive the hydraulic pump 18 when the air motor 24 is operated. The air motor 24 is also operably connected to a suitable source of air pressure, such as air line 26, through an in-line normally closed pilot operated air valve 28.

In the illustrated arrangement, the air supply line also includes a filter separator 30 and a lubricator 32. The hydraulic circuit also includes a check valve 34 between the pump 18 and the four-way hydraulic valve 20. The hydraulic circuit also includes a main pressure relief valve 36 and a retract pressure relief valve 38 to discharge hydraulic fluid to the tank 40 in the event the hydraulic pressure at the relief valves 36 or 38 exceeds a selected pressure.

An automatic shutoff control valve 44 is also provided to control the supply of pilot air pressure to the in-line normally closed valve 28 through air line 42. The automatic shutoff control valve includes a pilot operated 2 position, 3-way valve 46 between the air supply line 26 and the pilot line 42 of the in-line normally closed air valve 28. The pilot operated valve 46 is spring biased to a normally open position to supply an air signal to the pilot of air valve 28. The pilot 48 of the valve 46 is hydraulic and is operably connected through valve assembly 50 to the hydraulic fluid line 52 between the pump 18 and the hydraulic control valve 20.

The construction of the valve assembly 50 is shown in greater detail in FIGS. 2–5. The valve assembly 50 includes a valve body 54 including a port 56 operably connected to the hydraulic fluid line 52. The valve body 54 includes a fluid passage 58 housing a spring biased check valve 60, the check valve 60 including a valve seat 62 and movable valve member 64 biased against the valve seat 62 by a compression spring 66. The valve body 54 also includes a second fluid passage 68 housing a spring biased check valve 70. The check valve 70 includes a valve seat 71 and a movable valve member 73 biased against the valve seat 71 by a compression spring 75. A first port 72 (FIG. 4) supplies fluid under pressure to the fluid passage 68 past valve seat 94 through fluid passage 95 to a second port 74 that is connected to the pilot 48 of the valve 46. A movable plunger 80 is housed in the fluid passage and is selectively engagable with the movable valve member 73 of check valve 70 to open the check valve 70 to provide fluid flow from port 74 to port 93. A seal 81 surrounds plunger 80 to provide a fluid tight seal between the plunger 80 and the bore or passage 68. The plunger 80 has its travel toward check valve 70 limited by contact with valve seat 94. When plunger 80 contacts valve seat 94, pressurized fluid is prevented from passing through passage 95 to port 74. The passage 58 is connected to the fluid passage 68 by a passage 82 such that fluid pressure through the check valve 60 will act on the plunger 80 to force the plunger 80 into engagement with the check valve 70. The plunger 80 opens check valve 70 to provide for fluid flow from the pilot 48 to the exhaust port 93 (FIG. 4) allowing pilot pressure from fluid passage 42 to escape to atmosphere.

The valve body 54 further includes a fluid passage 84 housing a bypass valve 86 for providing for hydraulic fluid flow from the passage 82 of the check valve back to the port 56. The bypass valve includes a valve seat 88, a movable valve member 90 and a compression spring 92 resiliently maintaining valve member 90 against valve seat 88.

In operation of the automatic shut-off control valve 44, when the operator has actuated the hydraulic control valve 20 to supply fluid to the cylinder 10, when the piston 16 reaches the end of its stroke, the hydraulic fluid pressure produced by the pump 18 will be supplied through the fluid line 53 as a pilot signal to the valve 46 to shift the valve 46 thereby interrupting and exhausting the pilot signal to valve 28. Valve 28 will close to interrupt the air supply to air motor 24. Air motor 24 and pump 18 will stop until the operator shifts the control valve 20 to either of its other operating positions. When the valve spool of valve 20 is moved to a second position, the hydraulic fluid pressure in the line 53 and at the pilot 48 will be reduced. The spring biased control valve 46 will open to supply pilot air pressure to the in-line valve 28 causing the in-line valve to open and thereby cause actuation of the air motor 24 and pump 18.

One of the advantages of the construction of the invention is that it functions to throttle back the air motor when the fluid pressure at the air motor falls below a predetermined pressure. This prevents the pressure in the fluid supply line 26 from falling below the predetermined pressure thereby preventing the loss of fluid supply pressure from the system.

Figure 6:
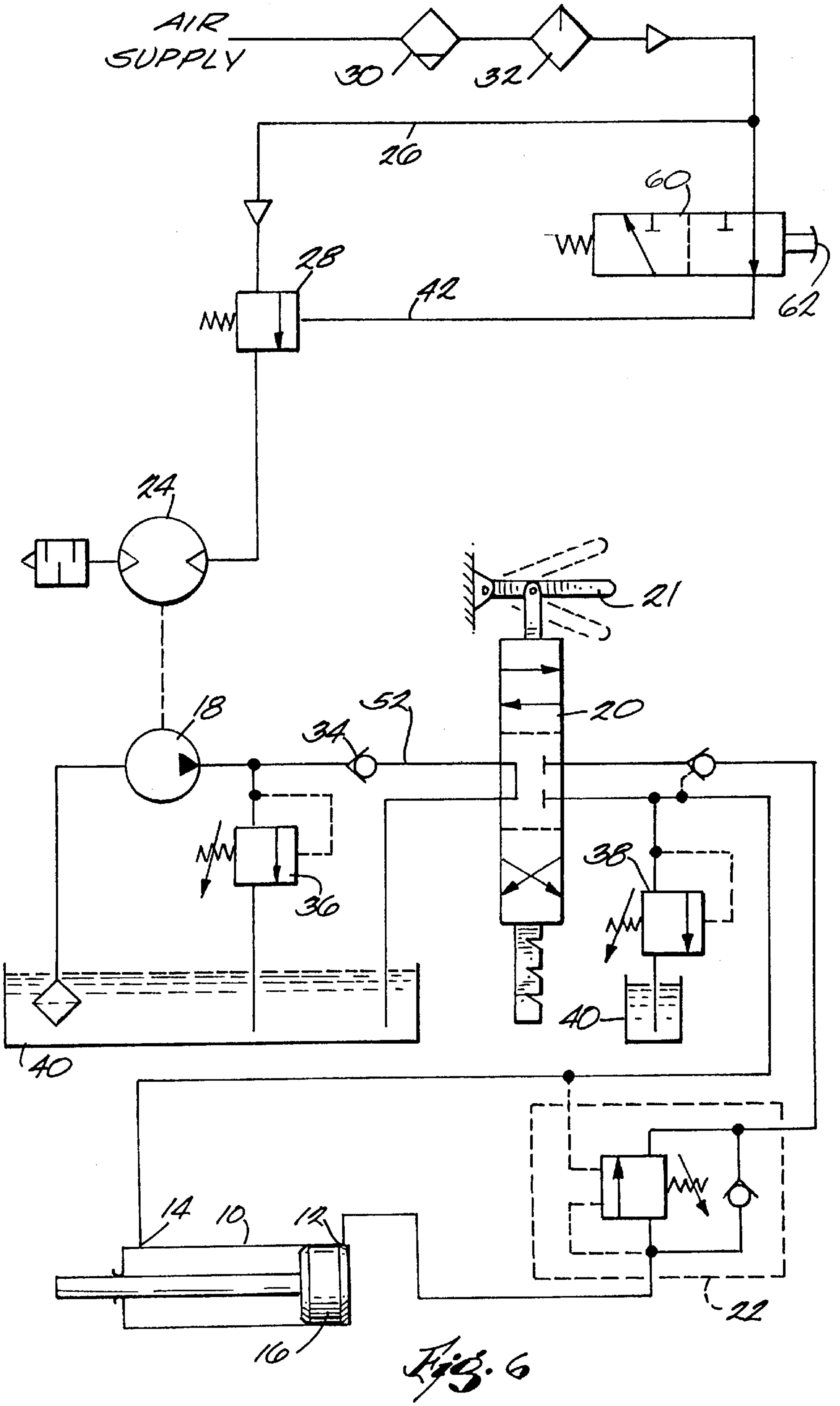
FIG. 6 is a schematic view similar to FIG. 1 but showing an alternative embodiment of the invention.

FIG. 6 illustrates an alternative embodiment of the air powered hydraulic lift system of the invention. The elements which are the same as those shown in FIG. 1 have like reference numbers. The normally closed pilot operated air valve 28 is operably connected by air line 42 to a manually operated valve 60. The manually operated valve 60 comprises a normally closed valve between the air supply line 26 and the pilot of valve 28. The manually operated valve 60 includes a plunger 62 for actuation by the operator and to open the air line 42. The manually operated valve 60 can be located remotely with respect to the hydraulic lift cylinder 10. To operate the lift cylinder 10, the operator can first position the control lever 21 of the hydraulic valve 20 to effect the desired movement of the lift cylinder 10, and the operator will then depress the plunger 62 of the manually operated air valve 60 to provide air flow to the air motor 24 to thereby drive the hydraulic pump 18. If the operator releases the plunger 62 of the manually operated air valve 60, the air motor 24 will stop and thereby interrupt operation of the pump 18.

I claim:

1. An air powered hydraulic lift system comprising:

a hydraulic cylinder having at least one fluid port for supply of hydraulic fluid pressure to the cylinder, an extensible piston in the cylinder, a hydraulic fluid pump for selectively supplying fluid under pressure to the fluid port, an air pressure driven motor operably connected to the hydraulic fluid pump to drive the hydraulic fluid pump, and a control valve for controlling the supply of hydraulic fluid pressure from the hydraulic fluid pump to the fluid port, and a valve assembly reducing the supply of air pressure to the air pressure driven motor when the fluid pressure supplied to the control valve exceeds a predetermined fluid pressure.

2. An air powered hydraulic lift system as set forth in claim 1, wherein the valve assembly includes a normally closed pilot operated valve controlling supply of fluid pressure to the motor and connected to the fluid pump.

3. An air powered hydraulic lift system as set forth in claim 2, wherein the normally closed pilot operated valve is operably connected to the fluid pump such that when the hydraulic fluid pressure generated by the fluid pump exceeds a predetermined pressure, the normally closed pilot operated valve closes to reduce flow to the air motor.

4. An air powered hydraulic lift system as set forth in claim 1, and further including an air motor actuating valve between the air supply and the pilot of the normally closed pilot operated valve, the air motor actuating valve including a pilot actuated by hydraulic fluid pressure supplied by the fluid pump.

5. An air powered hydraulic lift system comprising:

a hydraulic cylinder having at least one fluid port for supply of hydraulic fluid pressure to the cylinder, an extensible piston in the cylinder, a hydraulic fluid pump for selectively supplying fluid under pressure to the fluid port, an air pressure driven motor operably connected to the hydraulic fluid pump to drive the hydraulic fluid pump, and a control valve for controlling the supply of hydraulic fluid pressure from the hydraulic fluid pump to the fluid port, a valve assembly reducing the supply of air pressure to the air pressure driven motor when the fluid pressure supplied to the control valve exceeds a predetermined fluid pressure, wherein the valve assembly includes a normally closed pilot operated valve controlling supply of fluid pressure to the motor and connected to the fluid pump, and wherein the normally closed pilot operated valve includes a pilot and wherein the valve assembly includes a shutoff control valve.

6. A fluid powered fluid lift system comprising:

a cylinder having at least one fluid port for supply of fluid pressure to the cylinder, an extensible piston in the cylinder, a fluid pump for selectively supplying fluid under pressure to the fluid port, a fluid pressure driven motor operably connected to the fluid pump to drive the fluid pump, a control valve for controlling the supply of fluid pressure from the fluid pump to the fluid port, and a valve assembly controlling the supply of fluid pressure to the motor and reducing the supply of fluid pressure to the motor when the fluid pressure supplied to the control valve exceeds a predetermined fluid pressure.

7. A fluid powered lift system as set forth in claim 6, the valve assembly including a normally closed pilot operated valve controlling supply of fluid pressure to the motor and connected to the fluid pump.

8. A fluid powered lift system comprising:

a cylinder having at least one fluid port for supply of fluid pressure to the cylinder, an extensible piston in the cylinder, a fluid pump for selectively supplying fluid under pressure to the fluid port, a fluid pressure driven motor operably connected to the fluid pump to drive the fluid pump, a control valve for controlling the supply of fluid pressure from the fluid pump to the fluid port, a valve assembly controlling the supply of fluid pressure to the motor and reducing the supply of fluid pressure to the motor when the fluid pressure supplied to the control valve exceeds a predetermined fluid pressure, the valve assembly including a normally closed pilot operated valve controlling supply of fluid pressure to the motor and connected to the fluid pump, and the normally closed pilot operated valve including a pilot and wherein the valve assembly includes a shutoff control valve.

* * * * *